US010514682B2

(12) United States Patent
Kodama (10) Patent No.: US 10,514,682 B2
(45) Date of Patent: Dec. 24, 2019

(54) DEVICE SYSTEM, INFORMATION PROCESSOR, TERMINAL DEVICE, AND ABNORMALITY DETERMINING METHOD

(71) Applicant: YOKOGAWA ELECTRIC CORPORATION, Musashino-shi, Tokyo (JP)

(72) Inventor: Kazutoshi Kodama, Tokyo (JP)

(73) Assignee: Yokogawa Electric Corporation, Tokyo (JP)

(*) Notice: Subject to any disclaimer, the term of this patent is extended or adjusted under 35 U.S.C. 154(b) by 363 days.

(21) Appl. No.: 15/237,875

(22) Filed: Aug. 16, 2016

(65) Prior Publication Data

US 2017/0060122 A1 Mar. 2, 2017

(30) Foreign Application Priority Data

Aug. 27, 2015 (JP) .................. 2015-167776

(51) Int. Cl.
*G05B 19/418* (2006.01)
*G05B 19/048* (2006.01)
(Continued)

(52) U.S. Cl.
CPC ..... *G05B 19/4184* (2013.01); *G05B 23/0235* (2013.01); *G05B 2219/33273* (2013.01);
(Continued)

(58) Field of Classification Search
CPC ................ G05B 19/4184; G05B 23/0235
See application file for complete search history.

(56) References Cited

U.S. PATENT DOCUMENTS 8,949,668 B2 2/2015 Hanks et al.
2005/0027379 A1* 2/2005 Dyk .................. G05B 9/02
700/79

(Continued)

FOREIGN PATENT DOCUMENTS

JP 2002-049419 A 2/2002
JP 2002-287818 A 10/2002
(Continued)

OTHER PUBLICATIONS

Kouhei Matsumoto, "PRM R3.0 New Plant Resource Manager", Yokogawa Technical Report, 2007, p. 41-44, vol. 51, No. 2.
(Continued)

*Primary Examiner* — Moazzam Hossain
(74) *Attorney, Agent, or Firm* — Sughrue Mion, PLLC (57) ABSTRACT

A device system includes a terminal device which is usable by a plant worker, and an information processor which is connectable to the terminal device through a network. The terminal device includes a collector configured to collect a detection result from a sensor which detects a state around a device installed in a plant, and a communicator configured to transmit the detection result collected by the collector to the information processor. The information processor includes a storage which stores teacher data in which past detection results obtained by the sensor and data representing whether or not an abnormality exists in the device are associated with each other, and an analyzer configured to determine whether or not an abnormality exists in the device based on the detection result transmitted from the communicator and the teacher data stored in the storage.

20 Claims, 8 Drawing Sheets

(51) Int. Cl.
  *G05B 23/02* (2006.01)
  *G06F 11/00* (2006.01)
  *G06F 15/00* (2006.01)
(52) U.S. Cl.
  CPC .............. *G05B 2219/34465* (2013.01); *G05B 2219/37337* (2013.01)

(56) References Cited

U.S. PATENT DOCUMENTS

| | | | |
|---|---|---|---|
| 2005/0197803 A1* | 9/2005 | Eryurek | G05B 23/0289 702/185 |
| 2005/0197805 A1* | 9/2005 | Eryurek | G05B 23/0272 702/188 |
| 2007/0043539 A1* | 2/2007 | Niina | G05B 23/0221 702/188 |
| 2011/0202312 A1 | 8/2011 | Sumi et al. | |
| 2011/0295561 A1* | 12/2011 | Nagase | G05B 19/4183 702/188 |
| 2013/0073228 A1 | 3/2013 | Fulghum et al. | |
| 2013/0150985 A1* | 6/2013 | Ohkado | G06F 21/552 700/79 |
| 2014/0156032 A1 | 6/2014 | Jenkins et al. | |
| 2014/0282257 A1* | 9/2014 | Nixon | G05B 11/01 715/835 |

FOREIGN PATENT DOCUMENTS

| | | |
|---|---|---|
| JP | 2005-241089 A | 9/2005 |
| JP | 2012-073841 A | 4/2012 |
| JP | 2014-139724 A | 7/2014 |
| WO | 2014127803 A1 | 8/2014 |

OTHER PUBLICATIONS

Isao Hirooka et al., "FieldMate Field Device Management Tool for the New Era", Yokogawa Technical Report, 2007, p. 45-48, vol. 51, No. 2.

* cited by examiner

FIG. 10

DEVICE SYSTEM, INFORMATION PROCESSOR, TERMINAL DEVICE, AND ABNORMALITY DETERMINING METHOD

BACKGROUND

Technical Fields

The disclosure relates to a device system, an information processor, a terminal device, and an abnormality determining method.

Priority is claimed on Japanese Patent Application No. 2015-167776, filed Aug. 27, 2015, the contents of which are incorporated herein by reference.

Related Art

In a plant and a factory (hereinafter, called simply "plant" as a generic name of them), a DCS (Distributed Control System) is established, and an advanced automatic operation is implemented. In the distributed control system, field devices or example, a measurement device, a manipulation device, a display device, an alarm device, and other devices) and a controller controlling the field devices are connected to each other through a network. Process data which is necessary for a process control are transmitted and received between the controller and the field device.

Recently, a PAM (Plant Asset Management) system is often installed with the distributed control system so as to increase efficiency of the plant to a maximum level. The plant asset management system performs maintenance of devices and apparatuses installed in the plant, and the plant asset management system maintains and manages the facilities in an appropriate state over a long time. For example, a PRM (Plant Resource Manager) which is an example of the plant asset management system is disclosed in "PRM R3.0 NEW PLANT RESOURCE MANAGER", MATSUMOTO Kouhei et al., Yokogawa Technical Report English Edition, No. 44, 2007, pages 5 to 8 (also published in Yokogawa Technical Report, Vol. 51, No. 2, 2007, pages 41 to 44, in Japanese), If an abnormality occurs in the plant, a plant worker sets a parameter of a field device, adjusts the field device, and checks a state of the field device by using a terminal device. For example, a terminal device used by a plant worker and a field device management tool installed in the terminal device are disclosed in "FieldMate FIELD DEVICE MANAGEMENT TOOL FOR THE NEW ERA", HIROOKA Isao et al., Yokogawa Technical Report English Edition, No. 44, 2007, pages 9 to 12 (also published in Yokogawa Technical Report, Vol. 51, No. 2, 2007, pages 45 to 48 in Japanese).

When the plant worker checks the field device, the plant worker determines whether or not an abnormality has occurred in the field device by using five senses. For example, the plant worker senses an abnormal operation sound by using an auditory sense, and senses a leakage of a pipeline by using a visual sense or a smelling sense, in order to determine whether or not an abnormality has occurred in the field device. However, if the worker has a little knowledge and a little experience, the worker may not notice the abnormality which has occurred in the field device.

SUMMARY

A device system may include a terminal device which is usable by a plant worker, and an processor which is connectable to the terminal device through a network. The terminal device may include a collector configured to collect a detection result from a sensor which detects a state around a device installed in a plant, and a communicator configured to transmit detection result collected by the collector to the information processor. The information processor may include a storage which stores teacher data in which past detection results obtained by the sensor and data representing whether or not an abnormality exists in the device are associated with each other, and an analyzer configured to determine whether or not an abnormality exists in the device based on the detection result transmitted from the communicator and the teacher data stored in the storage.

Further features and aspects of the present disclosure become apparent from the following detailed description of exemplary embodiments with reference to the attached drawings.

DETAILED DESCRIPTION OF THE EMBODIMENTS

The embodiments of the present invention be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide a device system, an information processor, a terminal device, and an abnormality determining method which can accurately determine whether or not an abnormality has occurred in a field device even if a worker has a little knowledge and a little experience.

Hereinafter, a device system, an information processor, a terminal device, and an abnormality determining method will be described with reference to drawings.

Figure 1:
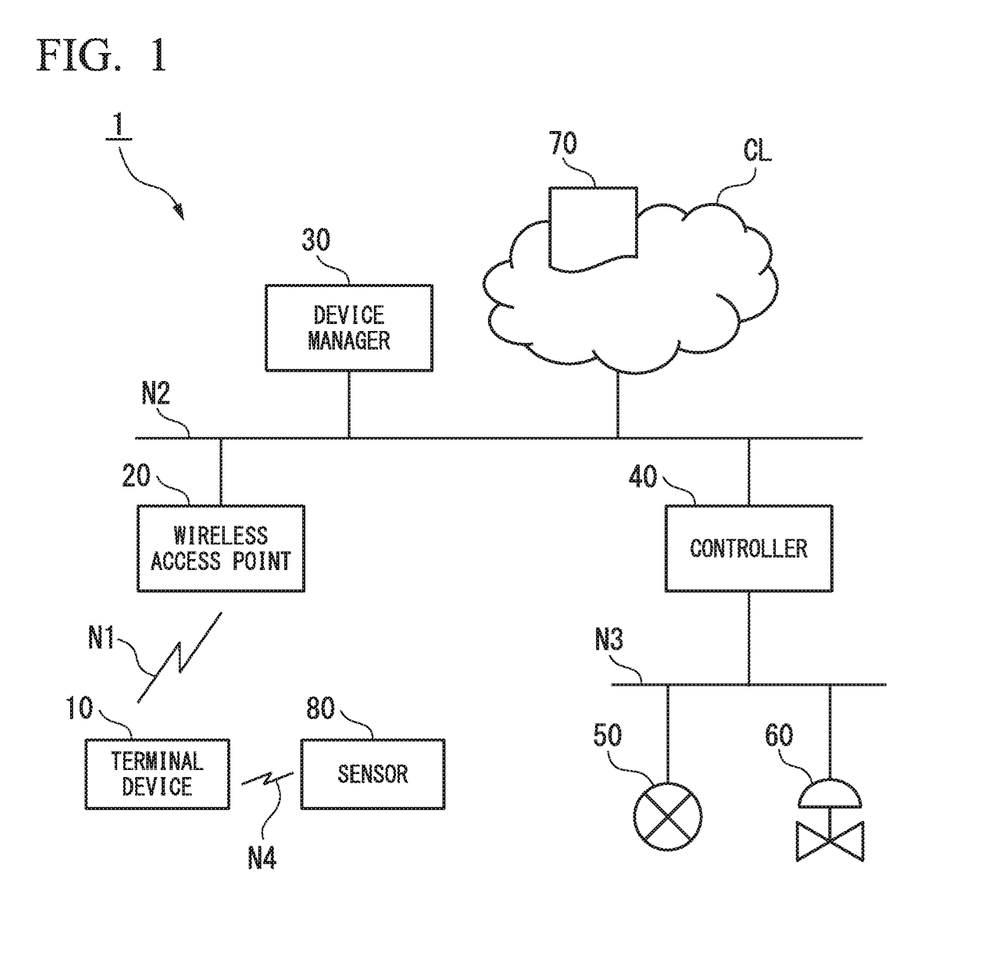
FIG. 1 is a block diagram illustrating an example of a whole configuration of a device system 1.

FIG. 1 is a block diagram illustrating an example of a whole configuration of a device system 1. As shown in FIG. 1, the device system 1 is equipped with a terminal device 10, a wireless access point 20, a device manager 30, a controller 40, field devices 50 and 60, an information processor 70, and a sensor 80.

The terminal device 10 and the wireless access point 20 are connected through a wireless network N1. The wireless access point 20 and the device manager 30 are connected to an intranet N2. The wireless network N1 is a wireless network provided in a field of a plant by the wireless point 20. The wireless network N1 is a wireless network which can perform wireless communication in conformity with wireless communication standards, such as Wi-Fi (registered trademark), WiMAX (registered trademark), 3G/LTE (registered trademark), ISA100.11a, WirelessHART (registered trademark), and so on. The intranet N2 is a network such as Ethernet (registered trademark) installed in a monitoring room of the plant.

The plant includes an industrial plant such as a chemical industrial plant, a plant managing and controlling a wellhead (for example, a gas field and an oil field), a plant managing and controlling a generation of electric power (for example, water power, fire power, and nuclear power), a plant managing and controlling a power harvesting (for example, solar power and wind power plant managing aging and controlling water supply and sewerage systems, a dam, and so on.

The field devices 50 and 60 are such as a sensor device (for example, a flowmeter and a temperature sensor), a valve device (for example, a flow control valve and an on-off valve) an actuator device (for example, a fan and a motor), and other devices installed in the plant. The field devices 50 and 60 are devices controlled by the controller 40. The controller 40 and the field devices 50 and 60 are connected to each other through a field network N3.

In an example of FIG. 1, the field device 50 is shown as a flowmeter, and the field device 60 is shown as a valve device. The controller 40 controls an opening/closing operation of the valve device 60 based on flow quantity of fluid flowing in a pipe, which is measured by the flowmeter 50. The field devices 50 and 60 may be a vibration sensor which monitors vibration of a pipe and a valve device, or may be a noise sensor which monitors sound emitted from an tor device.

The information processor 70 is a cloud server provided in a cloud CL. The information processor 70 communicates with the terminal device 10 through the intranet N2, the wireless access point 20, and the wireless network N1. The information processor 70 has a function of collecting data from the terminal device 10, a function of storing the collected data, and a function of analyzing the data collected from the terminal device 10.

The sensor 80 detects a state around the field device installed in the plant. When a plant worker W checks a field device, the plant worker W carries the terminal device 10 and the sensor 80 to the place of the field device which is a check target. The terminal device 10 and the sensor 80 are connected through a short-distance wireless network N4. The short-distance wireless network N4 is a wireless network which is in conformity with wireless communication standards, such as Bluetooth (registered trademark).

If an abnormality occurs in the plant, the plant worker W investigates a factor of the abnormality. The terminal device 10 is a device used for displaying a check list of field devices which are investigation targets, and is used by the plant worker W. For example, the terminal device 10 is a tablet computer, a notebook computer, or a smart phone. However, an arbitrary terminal device, which is equipped with functions required for displaying the check list, can be used.

Figure 2:
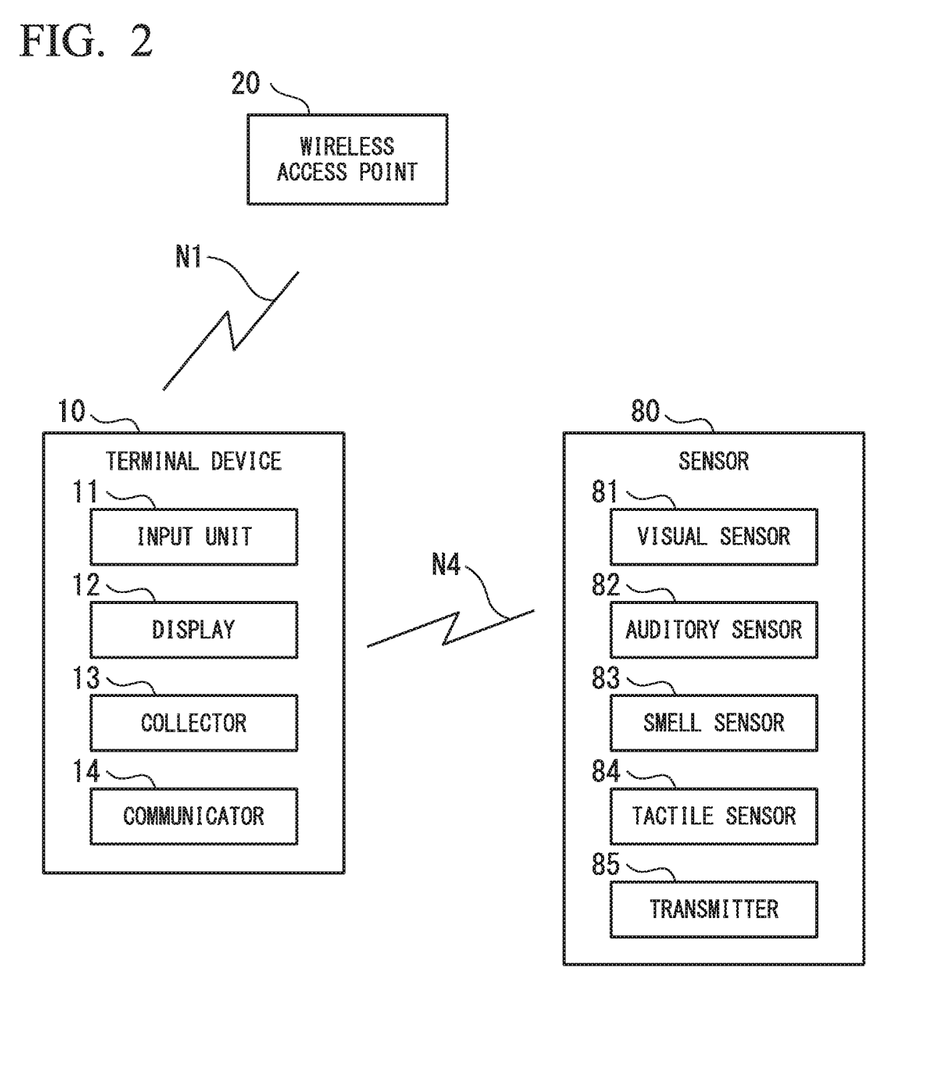
FIG. 2 is a block diagram illustrating an example of a main configuration of the terminal device and a main configuration of the sensor.

FIG. 2 is a block diagram illustrating an example of a main configuration of the terminal device and a main configuration of the sensor. As shown in FIG. 2, the sensor 80 includes a plurality of sensors (a visual sensor 81, an auditory sensor 82, a smell sensor 83, and a tactile sensor 84) and a transmission unit 85. For example, the visual sensor 81 is a camera which takes an image of the field device. For example, the auditory sensor 82 is a microphone which detects a sound around the field device. For example, the smell sensor 83 is a sensor which detects smell around the field device. For example, the tactile sensor is a sensor which detects a pressure from outside. The transmission unit 85 transmits detection results of the virtual sensor 81, the auditory sensor 82, the smell sensor 83, and the tactile sensor 84, to the terminal device 10 through the short-range wireless network N4.

As shown in FIG. 2, the terminal device 10 is equipped with an input unit 11, a display 12, a collector 13, and a communicator 14, For example, the input unit 11 is a touchpad which receives an input from the plant worker W. If the plant worker W checks the field device, the plant worker W instructs to display a check list by using the input unit 11. Although details will be described later, the plant worker W inputs a check item at a time of checking and a determination result representing whether an abnormality exists or not by using the input unit 11.

For example, the display 12 is a liquid crystal display, an organic EL (Electro Luminescence) display, or the like. The display 12 displays a check list of the e field devices, an input screen of a check result, an analysis result representing whether an abnormality exists or not, and so on. The collector 13 collects a detection result of the sensor 80 through the short-distance wireless network N4 from the sensor 80.

The communicator 14 has a function of transmitting information to the wireless access point 20, and a function of receiving information from the wireless access point 20. The communicator 14 transmits, to the information processor 70, the detection result of the sensor 80 collected by the collector 13.

Figure 3:
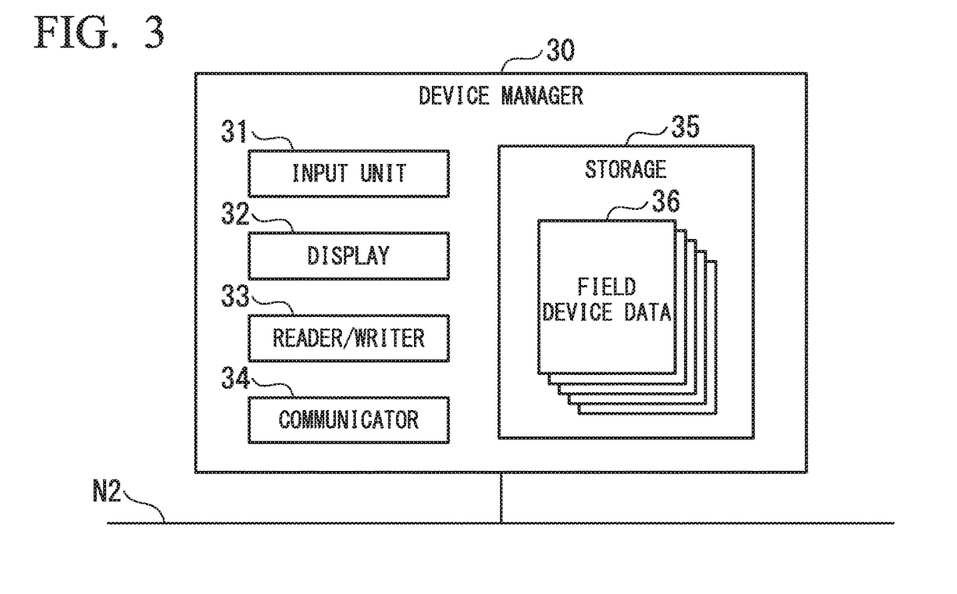
FIG. 3 is a block diagram illustrating an example of a main configuration of the device manager.

FIG. 3 is a block diagram illustrating an example of a main configuration of the device manager. As shown in FIG. 3, the device manager 30 is equipped with an input unit 31, a display 32, a reader/writer 33, a communicator 34, and storage 35. For example, the input unit 31 is an input device, such as a keyboard and a mouse. For example, the display 32 is a display such as a liquid crystal display.

The reader/writer 33 writes information into the storage 35, and reads information out of the storage 35. The communication 34 has a function of transmitting information to the intranet N2, and a function of receiving information from the intranet N2. The storage 35 stores field device data which represents data of field devices installed in the plant. A type of the field device, a model number of the field device, and an installation position of the field device are included in the field device data.

Figure 4:
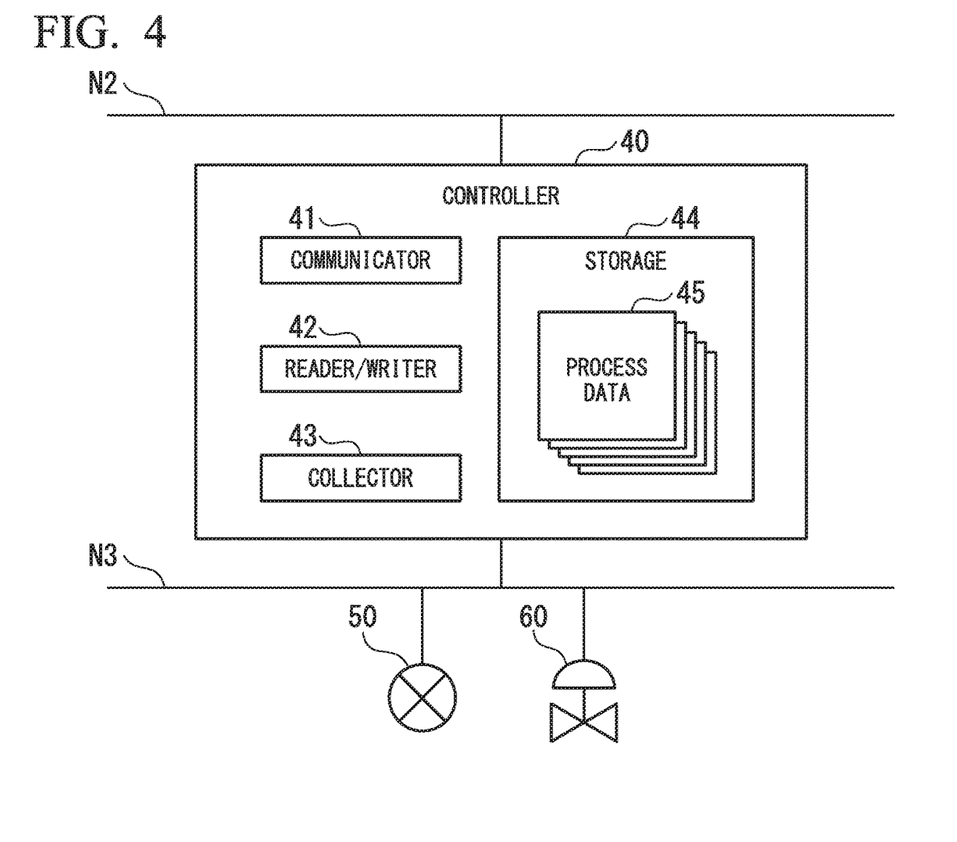
FIG. 4 is a block diagram illustrating an example of a main configuration of the controller.

FIG. 4 is a block diagram illustrating an example of a main configuration of the controller. As shown in FIG. 4, the controller 40 is equipped with a communicator 41, a reader/writer 42, a collector 43, and storage 44. The collector 43 collects process data 45 from the field devices 50 and 60 through the field network N3. The process data 45 is data (for example, measurement data, such as pressure, temperature, flow quantity, and so on) obtained by the field device. The reader/writer 42 writes the process data 45 collected by the collector 43 into the storage 44. The storage 44 stores process data of each of the field devices. The communicator 41 transmits the process data 45 to the information processor 70 through the intranet N2.

Figure 5:
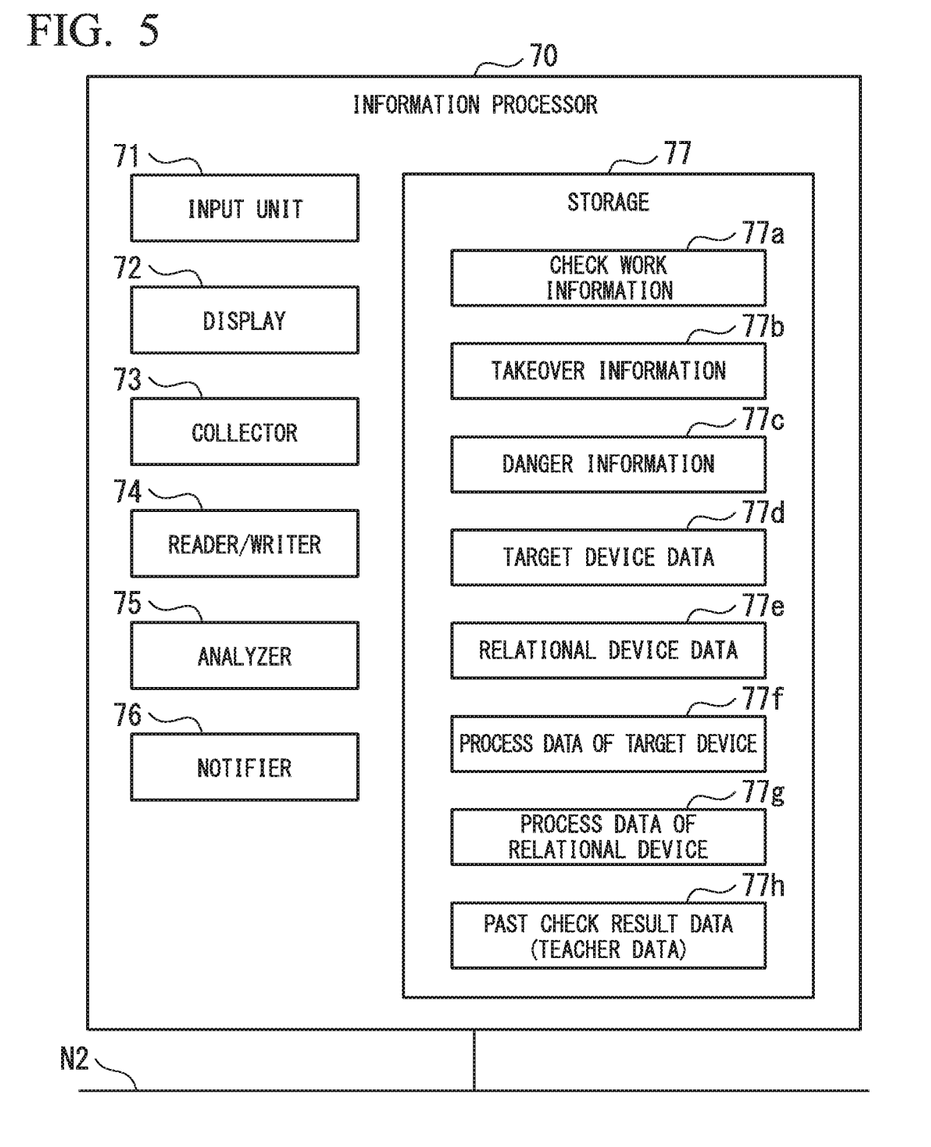
FIG. 5 is a block diagram illustrating an example of a main configuration of the information processor.

FIG. 5 is a block diagram illustrating an example of a main configuration of the information processor. As shown in FIG. 5, the information processor 70 is equipped with an input unit 71 a display 72, a collector 73, a reader/writer 74, an analyzer 75, a notifier 76, and storage 77. For example, the input unit 71 is an input device, such as a keyboard and a mouse. For example, the display 72 is a display such as a liquid crystal display.

The collector 73 collects the field device data from the device manager 30, and collects the process data from the controller 40. The reader/writer 74 writes, into the storage 77, the field device data 36 and the process data 45 which have been collected by the collector 73. Although details will be described later, the analyzer 75 analyzes the detection result of the sensor 80, and determines whether or not an abnormality exists in the field device. The notifier 76 notifies the analysis result of the analyzer 75 to the terminal device 10.

The storage 77 stores check work information 77a, takeover information 77b, danger information 77c, target device data 77d, relational device data 77e, process data 77f of a target device, process data 77g of a relational device, and past check result data (teacher data) 77h.

The check work information 77a is information, including a check list, a check schedule, a work procedure, and so on. The takeover information 77b is information input by the plant worker W when a work is taken over from the plant worker W to another worker. The danger information 77c is information which represents a dangerous area in the plant, where the plant worker W cannot enter. The target device data 77d is data which represents field device data (such as type and model number) of the field device (target device) which is a check target. The relational device data 77e is data which represents field device data (such as type and model number) of the field device (relational device) which is related to the target device.

For example, relational device is a field device installed within a predetermined distance from the target device, a field device which has a relation of process to the target device (for example, a field device installed in the same pipeline as the target device), and a field device which has a relation of control to the target device (for example, a field device which constitutes a control loop like a flowmeter and a valve which are related). Even if an abnormality has occurred in the target device, the plant worker W checks not only the target device but also the relational device because a fundamental factor of the abnormality may be in the relational device.

The process data 77f is process data corresponding to the target device, which has been collected from the controller 40. The process data 77g is process data corresponding to the relational device, which has been collected from the controller 40. The teacher data 77h is data in which past detection results obtained by the sensor 80, an existence/absence of an abnormality in a field device, and field device data (such as type and model number) have been associated with each other.

Next, a check work of the field device will be described. The reader/writer 74 of the information processor 70 reads the check work information 77a out of the storage 77. The check work information 77a includes a check list which represents a list of field devices to which a check work is conducted. The check list includes data for specifying the target device which is a check target, and data for specifying the relational device which is related to the target device.

The notifier 76 of the information processor 70 notifies the data for specifying the target device to the device manager 30. The reader/writer 33 of the device manager 30 reads the field device data 36 of the target device out of the storage 35 based on the data for specifying the target device.

The communicator 34 of the device manager 30 transmits the field device data 36 of the target device to the information processor 70.

The collector 73 of the information processor 70 collects the field device data 36 of the target device which has been transmitted from the communicator 34 of the device manager 30. The reader/writer 74 of the information processor 70 stores the field device data 36 of the target device, which has been collected by the collector 73, into the storage 77 as the target device data 77d.

The notifier 76 of the information processor 70 notifies the data for specifying the target device to the controller 40. The reader/writer 42 of the controller 40 read the process data 45 of the target device out of the storage 44. The communicator 41 of the controller 40 transmits the process data 45 of the target device to the information processor 70.

The collector 73 of the information processor 70 collects the process data 45 of the target device which has been transmitted from the communicator 41 of the controller 40. The reader/writer 74 of the information processor 70 stores the process data 45 of the target device, which has been collected by the collector 73, into the storage 77 as the process data 77f of the target device.

On the other hand, the notifier 76 of the information processor 70 notifies the data for specifying the relational device to the device manager 30. The reader/writer 33 of the device manager 30 reads the field device data 36 of the relational device out of the storage 35 based on the data for specifying the relational device. The communicator 34 of the device manager 30 transmits the field device data 36 of the relational device to the information processor 70.

The collector 73 of the information processor 70 collects the field device data 36 of the relational device which has been transmitted from the communicator 34 of the device manager 30. The reader/writer 74 of the information processor 70 stores the field device data 36 of the relational device, which has been collected by the collector 73, into the storage 77 as the relational device data 77e.

The notifier 76 of the information processor 70 notifies the data for specifying the relational device to the controller 40. The reader/writer 42 of the controller 40 reads the process data 45 of the relational device out of the storage 44. The communicator 41 of the controller 40 transmits the process data 45 of the relational device to the information processor 70.

The collector 73 of the information processor 70 collects the process data 45 of the relational device which has been transmitted from the communicator 41 of the controller 40. The reader/writer 74 of the information processor 70 stores the process data 45 of the relational device, which has been collected by the collector 73, into the storage 77 as the process data 77g of the relational device.

The notifier 76 of the information processor 70 transmits, to the terminal device 10, the check work information 77a, the takeover information 77b, and the danger information 77c, which are stored in the storage 77. These sets of information are received by the communicator 14 of the terminal device 10. The display 12 of the terminal device 10 displays the check work information 77a, the takeover information 77b, and the danger information 77c, which have been received by the communicator 14.

The plant worker W confirms that the field device which is a check target is not in a dangerous area with reference to the danger information 77c. Thereafter, the plant worker W starts a check work. The plant worker W checks the check work information 77a in order to understand the target device, the relational device, the check schedule, and the work procedure. The plant worker W uses the takeover information 77b for the check work.

The notifier 76 of the information processor 70 transmits, to the terminal device 10, the process data 77f of the target device and the process data 77g of the relational device which are stored in the storage 77. These sets of information are received by the communicator 14 of the terminal device 10. The display 12 of the terminal device 10 displays the process data 77f of the target device and the process data 77g of the relational device which have been received by the communicator 14.

The plant worker W determines whether or not an abnormality has occurred in the field device, by referring to the process data displayed on the display 12 and using five senses. At this time, the visual sensor 81, the auditory sensor 82, the smell sensor 83, and the tactile sensor 84, which are included in the sensor 80, detect a state around the field device.

Figure 6:
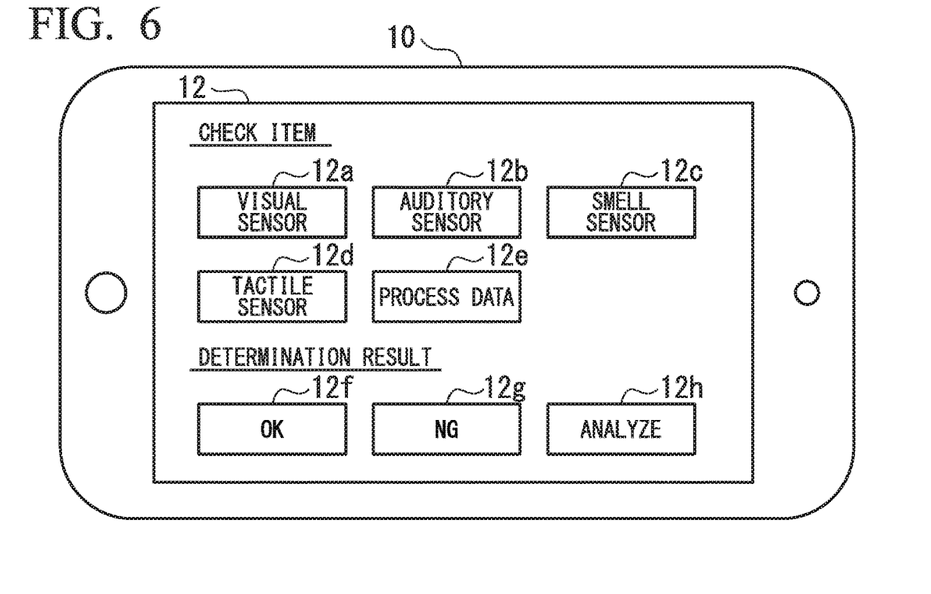
FIG. 6 is a drawing illustrating an example of the input screen displayed on the display of the terminal device.

FIG. 6 is a drawing illustrating an example of the input screen displayed on the display of the terminal device. As shown FIG. 6, the display 12 of the terminal device 10 displays check item selection keys visual sensor selection key 12a, an auditory sensor selection key 12b, a smell sensor selection key 12c, a tactile sensor selection key 12d, and a process data selection key 12e), a determination result selection keys (an OK selection key 12f, an NG selection key 12g, and an analysis instruction selection key 12h). The plant worker W selects at least one of the check item selection keys 12a to 12e, and selects at least one of the determination result selection keys 12f to 12h.

For example, if the plant worker W senses an abnormal sound and an abnormal smell from the field device, the plant worker W selects the auditory sensor selection key 12b and the smell sensor selection key 12c. If the plant worker W determines that an abnormality has not occurred in the field device, the plant worker W selects the OK selection key 12f. If the OK selection key 12f is selected, the communicator 14 of the terminal device 10 transmits, to the information processor 70, a detection result of the sensor 80 about the selected check item and a determination result (OK: normal).

If the plant worker W determines that an abnormality has occurred in the field device, the plant worker W selects the NG selection key 12g. If the NG selection key 12g is selected, the communicator 14 of the terminal device 10 transmits, to the information processor 70, a detection result of the sensor 80 about the selected check item and a determination result (NG: abnormal).

On the other hand, in the information processor 70, the collector 73 collects the detection result or the sensor 80 and the determination result, which have been transmitted from the terminal device 10. The reader/writer 74 writes, into the storage 77, the detection result of the sensor 80 and the determination result, which have been collected by the collector 73, in association with the target device data 77d or the relational device data 77e (such as type and model number). The storage 77 stores the data written by the reader/writer 74 as the teacher data 77h.

If the plant worker W cannot determine whether an abnormality exists or not, the plant worker W selects the analysis instruction selection key 12h shown in FIG. 6. If the analysis instruction selection key 12h is selected, the communicator 14 of the terminal device 10 transmits the detection result of the sensor 80 and analysis instructions to the information processor 70.

Figure 7:
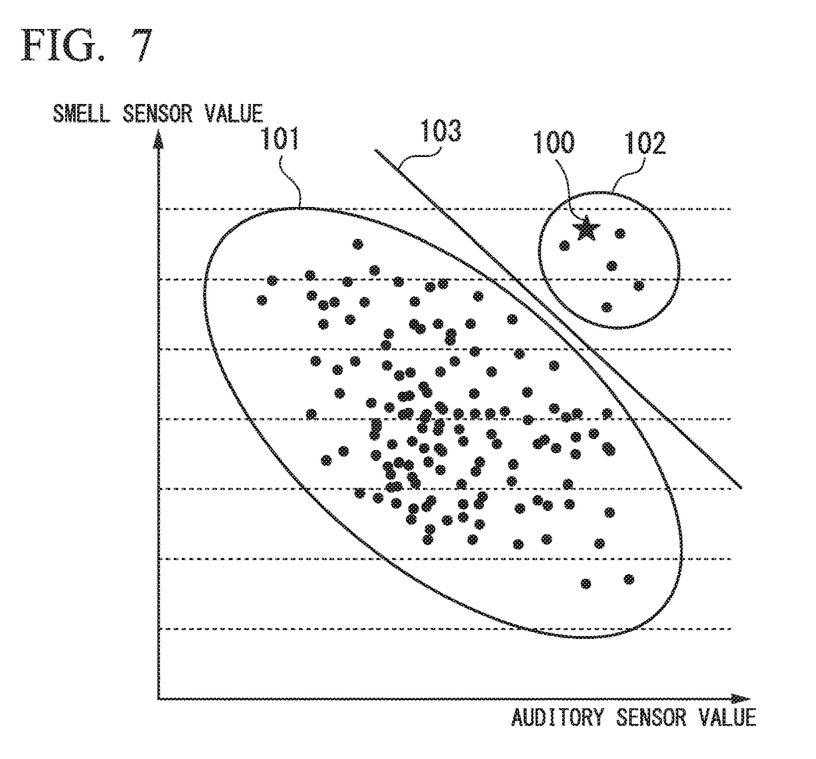
FIG. 7 is a drawing illustrating an example of distribution of detection values of the sensor and a determination result about normal or abnormal.

FIG. 7 is a drawing illustrating an example of distribution of detection values of the sensor and a determination result about normal or abnormal. In FIG. 7, the horizontal axis represents an auditory sensor value, and the vertical axis represents a smell sensor value. The data shown by black circles are past check result data (the teacher data 77h) stored in the storage 77. The data displayed here is the teacher data 77h of field devices which are the same model as the field device which is a check target. In FIG. 7, a current detection result 100 of the sensor 80, data group 101 determined as normal in the past, data group 102 determined as abnormal in the past, and a border line 103 between normal and abnormal are shown.

If the detection result of the sensor 80 and the analysis instructions have been received from the terminal device 10, the analyzer 75 of the information processor 70 performs analysis processing. Specifically, the analyzer 75 reads the teacher data 77h of the field device which is the same model as the field device being checked now out of the storage 77 by using the reader/writer 74 based on the target device data 77d or the relational device data 77e (such as type and model number of the field device). Thereafter, the analyzer 75 calculates the border line 103 between normal (OK) and abnormal (NG) by using a support vector machine based on the teacher data 77h which has been read out of the storage 77.

The analyzer 75 determines whether or not an abnormality exists in the field device based on the calculated border line 103 and the current detection result 100 of the sensor 80. In a case of the example shown in FIG. 7, since the current detection result 100 of the sensor 80 is located in an upper right of the border line 103, the analyzer 75 determines that an abnormality has occurred in the field device.

The notifier 76 notifies, to the terminal device 10, the data representing whether or not an abnormality exists in the field device, which has determined by the analyzer 75. The notifier 76 notifies screen data for displaying the analysis result shown in FIG. 7 to the terminal device 10.

Figure 8:
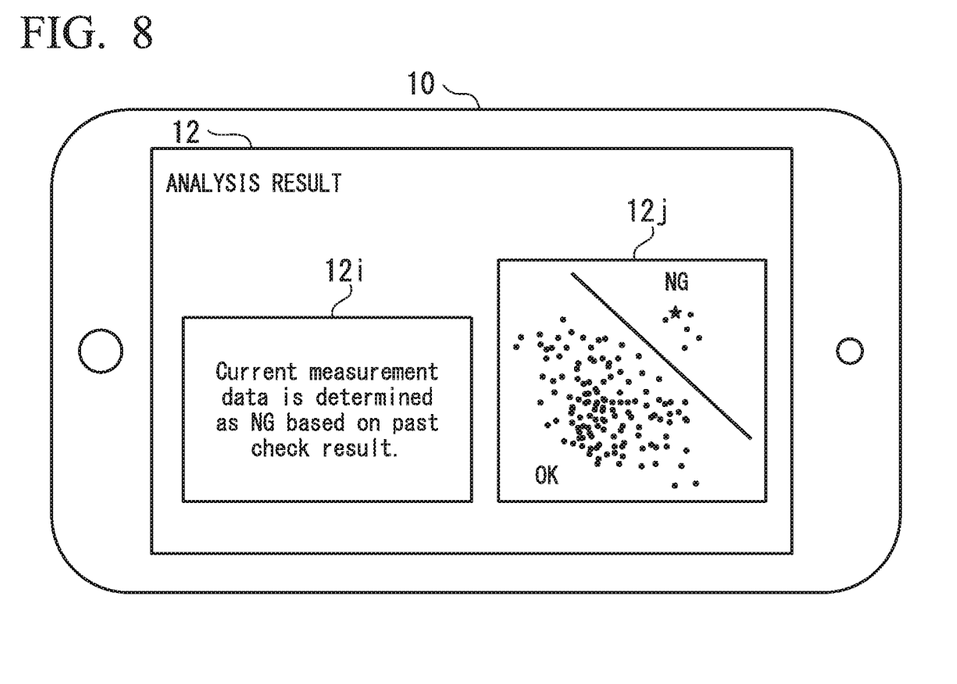
FIG. 8 is a drawing illustrating an example of an analysis result display screen displayed on the display of the terminal device.

FIG. 8 is a drawing illustrating an example of an analysis result display screen displayed on the display of the terminal device. As shown in FIG. 8, the display 12 displays a message 12i which represents whether or not an abnormality exists in the field device based on the data representing whether or not an abnormality exists, which has been notified by the notifier 76. The display 12 displays an image 12j based on the screen data, which has been notified by the notifier 76.

Thereby, even if the plant worker W has a little knowledge and a little experience, the plant worker W can accurately determine whether or not an abnormality has occurred in the field device. If a message which represents that an abnormality exists in the field device is displayed on the display 12, the plant worker W immediately requests exchange or repair of the field device to a manufacturer. Thereby, a safety of the plant is securable.

Figure 9:
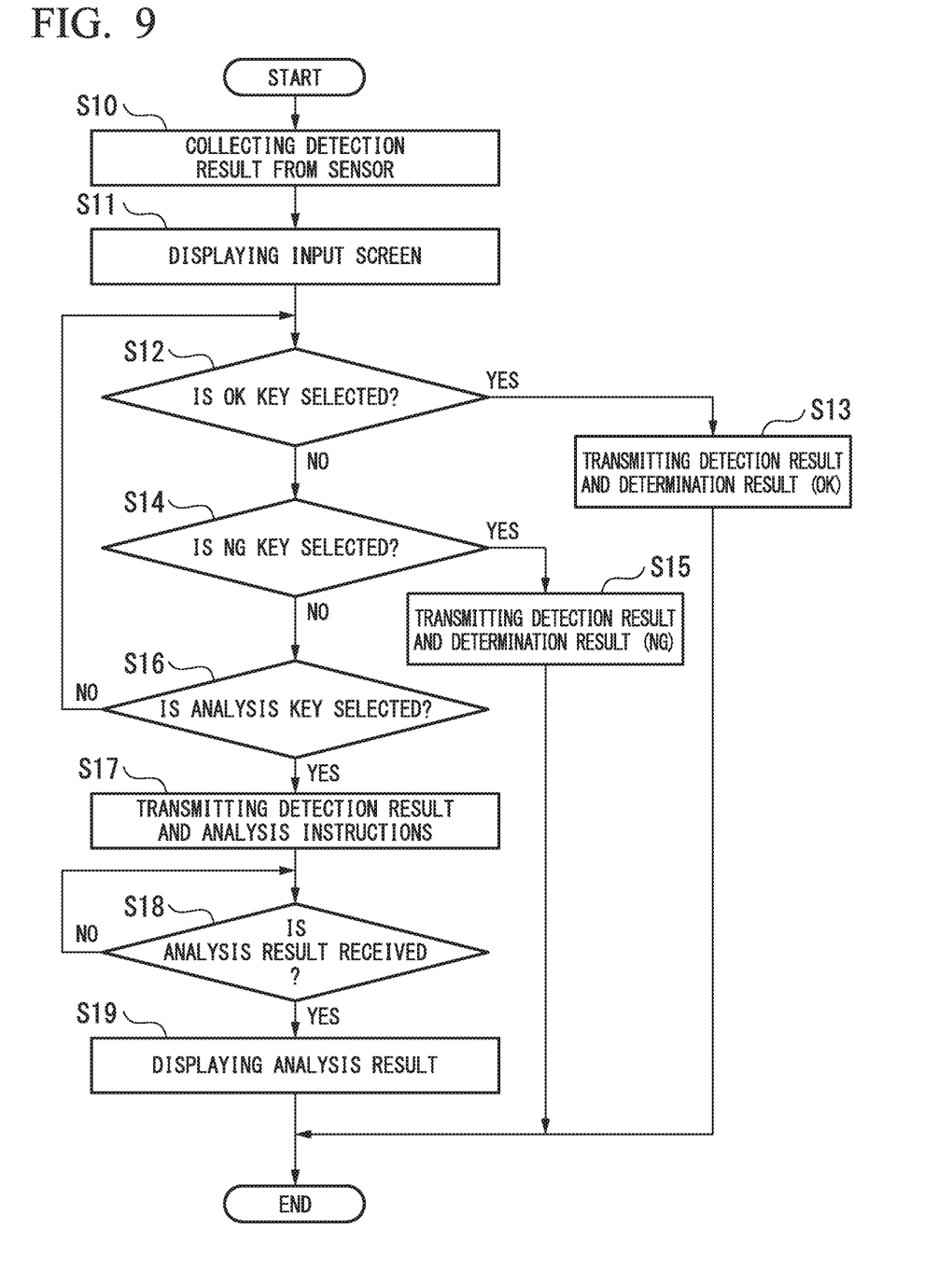
FIG. 9 is a flow chart illustrating a example of processing performed by the terminal device.

FIG. 9 is a flow chart illustrating an example of processing performed by the terminal device. The collector 13 of the terminal device 10 collects a detection result from the sensor 80 (Step S10). Thereafter, the display 12 displays the input screen shown in FIG. 6 (Step S11). The plant worker W selects at least one of the check item selection keys 12a to 12e, and selects at least one of the determination result selection keys 12f to 12h.

If the OK selection key 12f is selected by the plant worker W (Step S12: YES), the communicator 14 transmits, to the information processor 70, the detection result of the sensor 80 about the check item selected by using the check item selection keys 12a to 12e and the determination result (OK: normal) (Step S13). Thereafter, processing of this flow chart is ended. If the OK selection key 12f is not selected by the plant worker W (Step S12: NO), progressing to Step S14.

If the NG selection key 12g is selected by the plant worker W (Step S14: YES), the communicator 14 transmits, to the information processor 70, the detection result of the sensor 80 about the check item selected by using the check item selection keys 12a to 12e and the determination result (NG: abnormal) (Step S15). Thereafter, processing of this flow chart is ended. If the NG selection key 12g is not selected by the plant worker W (Step S14: NO), progressing to Step S16.

In Step S16, if the analysis instruction selection key 12h is selected by the plant worker W (Step S16: YES), the communicator 14 transmits, to the information processor 70, the detection result of the sensor 80 about the check item selected by using the check item selection keys 12a to 12e and the analysis instructions (Step S17), and progressing to Step S18. If the analysis instruction selection key 12h is not selected by the plant worker W (Step S16: NO), returning to Step S12.

In Step S18, if the communicator 14 receives an analysis result from the information processor 70 (Step S18: YES), the display 12 displays the analysis result display screen shown in FIG. 8 (Step S19), and processing of this flow chart is ended.

For example, a program for executing the flow chart shown in FIG. 9 may be stored in non-transitory storage medium, such as CD-ROM. If this recording medium is used, for example, the program can be installed in the terminal device 10.

Figure 10:
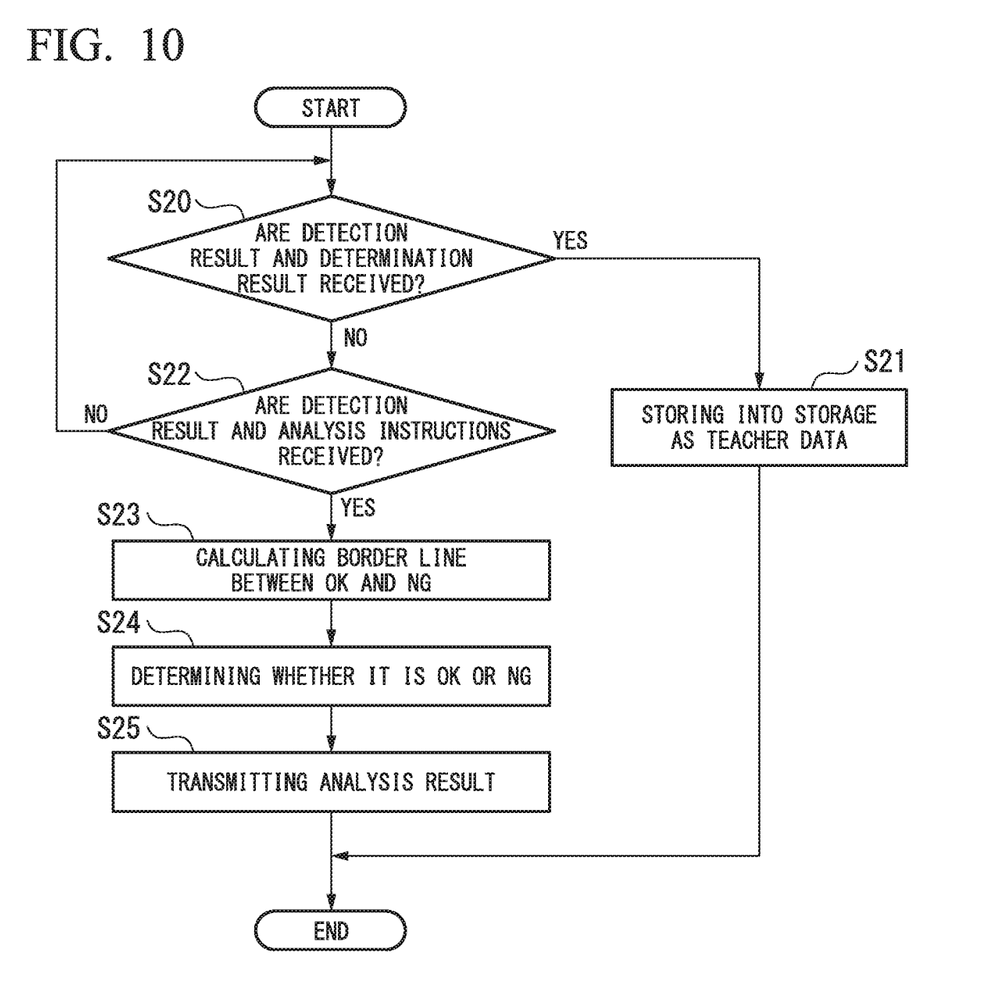
FIG. 10 is a flow chart illustrating an example of processing performed by the information processor.

FIG. 10 is a flow chart illustrating example of processing performed by the information processor. If the collector 73 of the information processor 70 has received the detection result he determination result which have been transmitted at Steps S13 and S15 of FIG. 9 (Step S20: YES), the reader/writer 74 writes, into the storage 77, the detection result and the determination result, which have been received by the collector 73, in association with the field device data (the target device data 77d or the relational device data 77e). The storage 77 stores the data written by the reader/writer 74 as the teacher data 77h (Step S21). On the other hand, if the collector 73 has not received the detection result and the determination result which have been transmitted at Step S13 and Step S15 of FIG. 9 (Step S20: NO), progressing to Step S22.

In Step S22, if the collector 73 has received the detection result and the analysis instructions, which have been transmitted at Step S17 of FIG. 9 (Step S22: YES), progressing to Step S23. On the other hand, if the collector 73 has not received the detection result and the analysis instructions, which have been transmitted at Step S17 of FIG. 9 (Step S22: NO), returning to Step S20.

If the detection result and the analysis instructions have been received in Step S22, as described by using FIG. 7, the analyzer 75 calculates the border line 103 between normal (OK) and abnormal (NG) by using a support vector machine based on the teacher data 77h stored in the storage 77 (Step S23). Thereafter, the analyzer 75 determines whether or not an abnormality exists in the field device based on the calculated border line 103 and the current detection result 100 of the sensor 80 (Step S24).

The notifier 76 notifies, to the terminal device 10, the data representing whether or not an abnormality exists in the field device, which has been determined by the analyzer 75, and the screen data for displaying the image 12j of FIG. 8 as an analysis result (Step S25). Thereafter, processing of this flow chart is ended.

For example, a program for executing the flow chart shown in FIG. 10 may be stored in non-transitory storage medium, such as CD-ROM. If this recording medium is used, for example, the program can be installed in the information processor 70.

In the present embodiment, although the analyzer 75 calculates the border line 103 based on the teacher data 77h of the field device which is the same model as the field device being checked now, but not limited thereto. For example, the analyzer 75 may calculate the border line 103 based on the teacher data 77h of the field device of the model similar to the field device being checked now. The analyzer 75 may determine whether it is a similar model or not based on the target device data 77d or the relational device data 77e such as type and model number of the field device).

In the present embodiment, although the sensor 80 is carried by the plant worker W, the sensor 80 may be installed at a place where the field device is installed. The terminal device 10 may be equipped with whole or a part of the sensor 80.

In the present embodiment, if the teacher data 77h stored in the storage 77 is less than a predetermined number, the analyzer 75 may not determine whether or not an abnormality exists in the field device. The predetermined number may be set beforehand by a plant operator by using the input unit 71 of the information processor 70. Thereby, an erroneous determination of the analyzer 75 caused by teacher data of which amount is little can be suppressed.

The present embodiment can also be used for education for the plant worker W. For example, an abnormality determination skill of the plant worker W can be improved by comparing a determination result of the plant worker W with an analysis result of the analyzer 75.

As described above, the device system 1 of the present embodiment is equipped with the terminal device 10 used by the plant worker W, and the information processor 70 connectable to the terminal device 10 through the network. The terminal device 10 includes the collector 13 which collects a detection result from the sensor 80 which detects the state around the field device installed in the plant, and the communicator 14 which transmits the detection result collected by the collector 13 to the information processor 70.

The information processor 70 includes the storage 77 which stores the teacher data 77h in which the past detection results obtained by the sensor 80 and the data whether or not an abnormality exists in the field device are associated with each other, and the analyzer 75 which determines whether or not an abnormality exists in the field device based on the detection result transmitted from the communicator 14 and the teacher data 77h stored in the storage 77.

Thereby, even if the plant worker has a little knowledge and a little experience, whether or not an abnormality has occurred in the field device can be accurately determined.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of present invention.

The tern "unit" is used to describe a component, unit or part of a hardware and/or software that is constructed and/or programmed to carry out the desired function. Typical examples of the hardware may include, but are not limited to, device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A device system comprising:
   a terminal device which is usable by a plant worker; and
   an information processor which is connectable to the terminal device through a network,
   wherein the terminal device comprises:
     a collector configured to collect a detection result from a sensor which detects a state around a device installed in a plant; and
     a communicator configured to transmit the detection result collected by the collector to the information processor,
   wherein the information processor comprises:
     a storage which stores teacher data in which past detection results obtained by the sensor and determination results representing whether or not an abnormality exists in the device are associated with each other and associated with device data of the device, the determination results being determined by the plant worker, the teacher data being obtained in a past work; and
     an analyzer configured to calculate a border line between normal and abnormal of the device based on the teacher data stored in the storage, the analyzer being configured to determine whether or not an abnormality exists in the device based on the border line calculated by the analyzer and the detection result transmitted from the communicator, the analyzer being configured to generate an analysis result comprising a current detection result of the sensor, a normal data group determined as normal in the past, an abnormal data group determined as abnormal in the past, and the border line calculated by the analyzer.

2. The device system according to claim 1,
   wherein the information processor further comprises:
   a notifier configured to notify data representing whether or not an abnormality exists in the device, which has been determined by the analyzer, to the terminal device.

3. The device system according to claim 2,
   wherein the terminal device further comprises:
   a display configured to display a message representing whether or not an abnormality exists in the device based on the data notified by the notifier.

4. The device system according to claim 3,
   wherein the sensor comprises a plurality of sensors,
   wherein the communicator is configured to receive process data obtained by the device, and
   wherein the display is configured to display a check item selector for allowing the plant worker to select at least one check item of the plurality of sensors and the process data, and configured to display a determination result selector for allowing the plant worker to select a determination result representing whether or not an abnormality exists in the device.

5. The device system according to claim 4,
   wherein the communicator is configured to transmit, to the information processor, the detection result of the sensor about the check item selected by using the check item selector and the determination result selected by using the determination result selector,
   wherein the storage stores the detection result and the determination result, which have been transmitted from the communicator, in association with each other as the teacher data.

6. The device system according to claim 3,
   wherein the display is configured to display an analysis instruction selector for instructing, to the analyzer, a determination whether or not an abnormality exists in the device,
   wherein the communicator is configured to transmit, to the information processor, the detection result of the sensor and analysis instructions in accordance with a selection of the analysis instruction selector, and
   wherein the analyzer is configured to calculate the border line between normal and abnormal of the device in accordance with the analysis instructions transmitted from the communicator.

7. The device system according to claim 1,
   wherein the analyzer is configured not to determine whether or not an abnormality exists in the device if the teacher data stored in the storage is less than a predetermined number.

8. An information processor comprising:
   a collector configured to collect a detection result of a sensor which detects a state around a device installed in a plant;
   a storage which stores teacher data in which past detection results obtained by the sensor and determination results representing whether or not an abnormality exists in the device are associated with each other and associated with device data of the device, the determination results being determined by the plant worker, the teacher data being obtained in a past work; and
   an analyzer configured to calculate a border line between normal and abnormal of the device based on the teacher data stored in the storage, the analyzer being configured to determine whether or not an abnormality exists in the device based on the border line calculated by the analyzer and the detection result collected by the collector, the analyzer being configured to generate an analysis result comprising a current detection result of the sensor, a normal data group determined as normal in the past, an abnormal data group determined as abnormal in the past, and the border line calculated by the analyzer.

9. The information processor according to claim 8, further comprising:
   a notifier configured to notify data representing whether or not an abnormality exists in the device, which has been determined by the analyzer, to a terminal device.

10. The information processor according to claim 9,
    wherein the analyzer is configured to receive analysis instructions from the terminal device, configured to calculate the border line between normal and abnormal of the device in accordance with the received analysis instructions.

11. The information processor according to claim 8, wherein the analyzer is configured not to determine whether or not an abnormality exists in the device if the teacher data stored in the storage is less than a predetermined number.

12. A terminal device comprising:
a collector configured to collect a detection result from a plurality of sensors which detect a state around a device installed in a plant;
a communicator configured to receive process data obtained by the device, the communicator being configured to transmit the detection result collected by the collector to the information processor according to claim 8; and
a display configured to display a check item selector for allowing a plant worker to select at least one check item of the plurality of sensors and process data, and configured to display a determination result selector for allowing the plant worker to select a determination result representing whether or not an abnormality exists in the device.

13. The terminal device according to claim 12, wherein the communicator is configured to transmit the detection result of the sensor about the check item selected by using the check item selector and the determination result selected by using the determination result selector.

14. The terminal device according to claim 13, wherein the display is configured to display an analysis instruction selector for instructing, to an information processor, a determination whether or not an abnormality exists in the device,
wherein the communicator is configured to transmit, to the information processor, the detection result of the sensor and analysis instructions in accordance with a selection of the analysis instruction selector.

15. An abnormality determining method comprising:
collecting a detection result from a sensor which detects a state around a device installed in a plant;
reading, out of a storage, teacher data in which past detection results obtained by the sensor and determination results representing whether or not an abnormality exists in the device are associated with each other and associated with device data of the device, the determination results being determined by the plant worker, the teacher data being obtained in a past work;
calculating a border line between normal and abnormal of the device based on the teacher data read out of the storage;
determining whether or not an abnormality exists in the device based on the calculated border line and the collected detection result; and
generating an analysis result comprising a current detection result of the sensor, a normal data group determined as normal in the past, an abnormal data group determined as abnormal in the past, and the border line.

16. The abnormality determining method according to claim 15, further comprising:
notifying data representing whether or not an abnormality exists in the device to a terminal device.

17. The abnormality determining method according to claim 16, further comprising:
displaying a message representing whether or not an abnormality exists in the device based on the notified data.

18. The abnormality determining method according to claim 17, further comprising:
receiving process data obtained by the device;
displaying a check item selector for allowing the plant worker to select at least one check item of the plurality of sensors and the process data; and
displaying a determination result selector for allowing the plant worker to select a determination result representing whether or not an abnormality exists in the device.

19. The abnormality determining method according to claim 18, further comprising:
transmitting, to an information processor, the detection result of the sensor about the check item selected by using the check item selector and the determination result selected by using the determination result selector; and
storing, in the storage, the detection result and the determination result in association with each other as the teacher data.

20. The abnormality determining method according to claim 17, further comprising:
displaying an analysis instruction selector for instructing a determination whether or not an abnormality exists in the device;
transmitting, to the information processor, the detection result of the sensor and analysis instructions in accordance with a selection of the analysis instruction selector; and
calculating the border line between normal and abnormal of the device in accordance with the analysis instructions.

* * * * *